US012737156B2

(12) United States Patent
Zhang et al.

(10) Patent No.: US 12,737,156 B2
(45) Date of Patent: Sep. 15, 2026

(54) MODEL MANAGEMENT APPARATUS AND METHOD, DATA MANAGEMENT APPARATUS AND METHOD AND SYSTEM

(71) Applicant: Beijing Bytedance Network Technology Co., Ltd., Beijing (CN)

(72) Inventors: He Zhang, Beijing (CN); Yang Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 357 days.

(21) Appl. No.: 17/999,112

(22) PCT Filed: May 25, 2021

(86) PCT No.: PCT/CN2021/095801
§ 371 (c)(1),
(2) Date: Nov. 17, 2022

(87) PCT Pub. No.: WO2021/238914
PCT Pub. Date: Dec. 2, 2021

(65) Prior Publication Data
US 2023/0185538 A1 Jun. 15, 2023

(30) Foreign Application Priority Data
May 27, 2020 (CN) ......................... 202010462093.5

(51) Int. Cl.
*G06F 9/44* (2018.01)
*G06F 8/20* (2018.01)
*G06F 11/3604* (2025.01)

(52) U.S. Cl.
CPC ............ *G06F 8/20* (2013.01); *G06F 11/3608* (2013.01)

(58) Field of Classification Search
CPC ............................... G06F 8/20; G06F 11/3608
See application file for complete search history.

(56) References Cited

U.S. PATENT DOCUMENTS

| | | | |
|---|---|---|---|
| 10,423,403 | B1 | 9/2019 | Natarajan et al. |
| 2005/0278576 | A1 | 12/2005 | Hekmatpour |

(Continued)

FOREIGN PATENT DOCUMENTS

| | | | |
|---|---|---|---|
| CA | 3003617 | A1 | 11/2018 |
| CA | 3078935 | A1 | 5/2019 |

(Continued)

OTHER PUBLICATIONS

China National Intellectual Property Administration, Office action issued in application No. 202010462093.5, Oct. 21, 2022, 12 pages. (Submitted with Concise Explanation of Relevance).

(Continued)

*Primary Examiner* — Bradley A Teets
*Assistant Examiner* — Lenin Paulino
(74) *Attorney, Agent, or Firm* — Alleman Hall LLP

(57) ABSTRACT

Embodiments of the present disclosure disclose a model management apparatus, method and system, where the apparatus includes a model storage module and a model update module; the model storage module is configured to store at least one functional model; the model update module is connected to the model storage module, and is configured to obtain a target functional model to be updated from the model storage module according to a received update instruction, perform functional update on the target functional model to be updated based on a target model data set, and transmit an updated target functional model to the model storage module for storage; where the target functional model is called by a model application apparatus to cause the model application apparatus to implement a set function, and the model application apparatus and the model management apparatus are set up independently of each other.

18 Claims, 6 Drawing Sheets

In a case that a model update module updates a target functional model, provide, through a database module, the model update module with a target model data set used for update — 610

↓

In a case that a regression test instruction is received through a regression test module, obtain, through the regression test module, a target test case set from the database module according to the regression test instruction, and test a set function of a model application apparatus based on the target test case set to test compatibility between an updated target functional model and an associated functional model thereof — 620

(56) References Cited

U.S. PATENT DOCUMENTS

| | | | |
|---|---|---|---|
| 2011/0054893 | A1 | 3/2011 | Williams et al. |
| 2015/0169436 | A1 | 6/2015 | Tamilmani et al. |
| 2016/0092348 | A1* | 3/2016 | Straub ........................ G06F 8/61 717/124 |
| 2016/0232457 | A1* | 8/2016 | Gray ........................ G06F 16/26 |
| 2017/0046245 | A1* | 2/2017 | Liu ........................ G06F 11/368 |
| 2017/0060734 | A1 | 3/2017 | Raz et al. |
| 2017/0171029 | A1 | 6/2017 | Maknojia et al. |
| 2018/0113799 | A1 | 4/2018 | M.V et al. |
| 2018/0173606 | A1 | 6/2018 | Malla et al. |
| 2018/0348780 | A1* | 12/2018 | Zheng .................. G05D 1/0257 |
| 2019/0035387 | A1* | 1/2019 | Zitouni ................. G10L 15/063 |
| 2019/0102700 | A1* | 4/2019 | Babu ...................... G06N 20/00 |
| 2019/0179733 | A1 | 6/2019 | Lyberis |
| 2019/0266076 | A1* | 8/2019 | Maliani ............... G06F 11/3684 |
| 2019/0303212 | A1 | 10/2019 | Bosch et al. |
| 2019/0384650 | A1* | 12/2019 | Danielsson ............... G06F 8/65 |
| 2020/0050443 | A1 | 2/2020 | Edelsten et al. |
| 2021/0103516 | A1* | 4/2021 | De Sousa Bispo .......................... G06F 11/3688 |
| 2021/0264321 | A1* | 8/2021 | Xiang ..................... G06F 16/00 |

FOREIGN PATENT DOCUMENTS

| | | | |
|---|---|---|---|
| CN | 106156186 | A | 11/2016 |
| CN | 106610854 | A | 5/2017 |
| CN | 107247592 | A | 10/2017 |
| CN | 108764808 | A | 11/2018 |
| CN | 110516090 | A | 11/2019 |
| CN | 110738304 | A | 1/2020 |
| CN | 110955470 | A | 4/2020 |
| WO | 2016196701 | A1 | 12/2016 |

OTHER PUBLICATIONS

ISA China National Intellectual Property Administration, International Search Report issued in application No. PCT/CN2021095801, WIPO, 13 pages.

China National Intellectual Property Administration, Notification of granting patent right issued in Application No. 202010462093.5, Mar. 21, 2023, 17 pages.

Yao, J. et al., “Design and implementation of master model management system based on Redis,” Software Guide, vol. 16, No. 5, May 31, 2017, 6 pages. Submitted with English abstract.

* cited by examiner

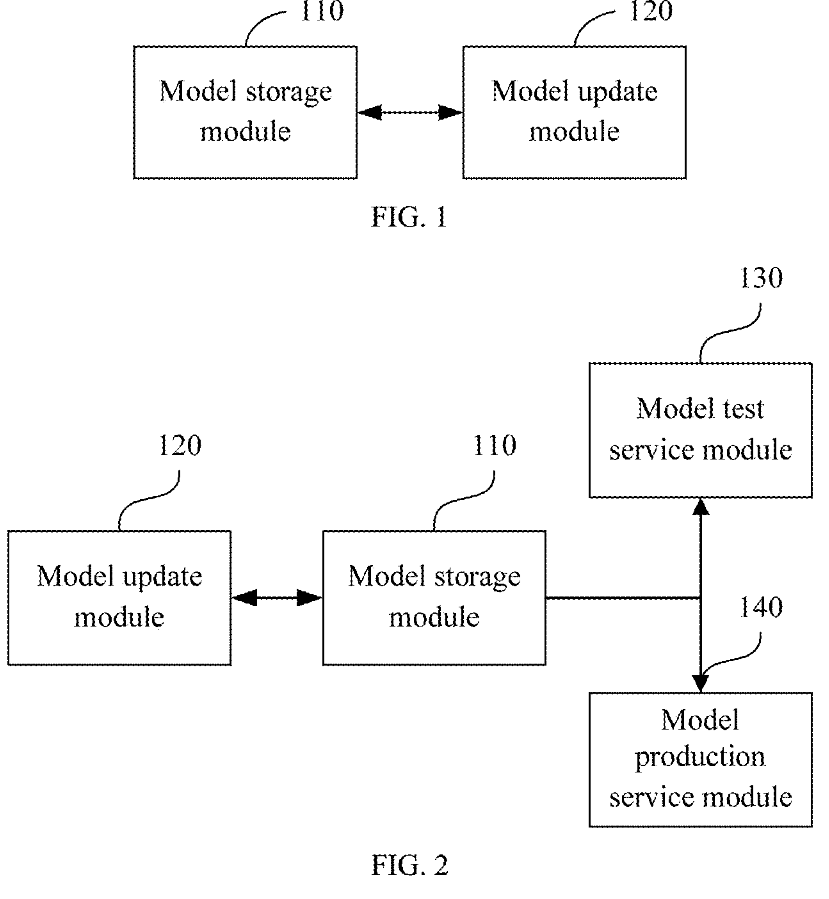
FIG. 1
FIG. 2
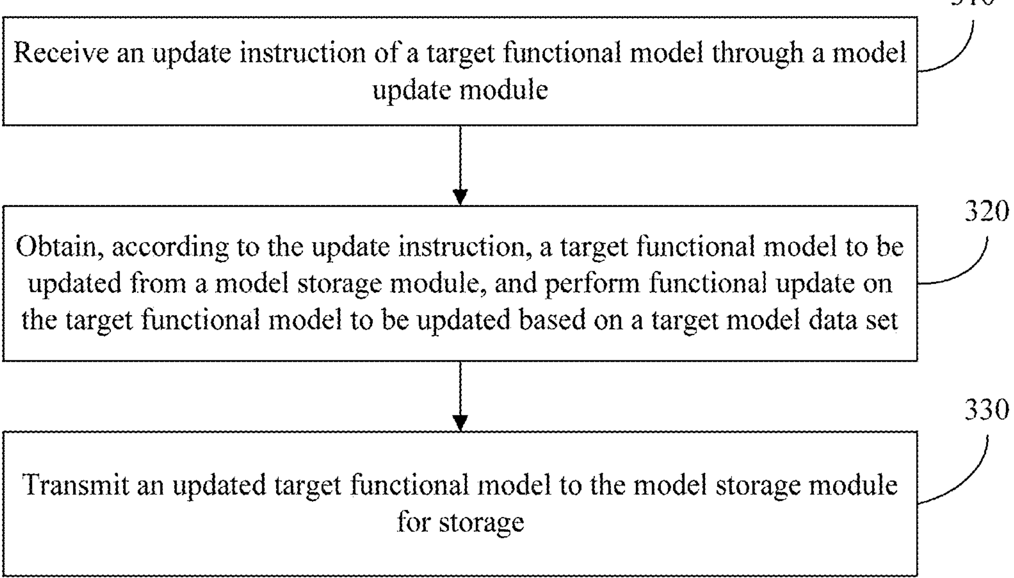
FIG. 3

MODEL MANAGEMENT APPARATUS AND METHOD, DATA MANAGEMENT APPARATUS AND METHOD AND SYSTEM

CROSS-REFERENCE TO RELATED APPLICATIONS

This application is a National Stage of International Application No. PCT/CN2021/095801, filed on May 25, 2021, which claims priority to Chinese Patent Application No. 202010462093.5, filed on May 27, 2020, both of which are hereby incorporated by reference in their entireties.

TECHNICAL FIELD

Embodiments of the present disclosure relate to the field of computer technology, and in particular, to a model management apparatus and method, a data management apparatus and method, an intelligent dialogue system, an electronic device, and a storage medium.

BACKGROUND

Recently, with the rapid development of artificial intelligence technology, human-computer dialogue systems are becoming more and more mature. A human-computer dialogue system generally includes subsystems such as speech recognition, natural language understanding, dialogue management, natural language generation, and speech synthesis.

In order to make the human-machine dialogue system easy to use, an intelligent dialogue platform encapsulates the subsystems such as speech recognition, natural language understanding, dialogue management, natural language generation and speech synthesis in the intelligent dialogue platform, so that the human-machine dialogue system can be created and maintained through a graphical interactive interface. During the maintenance of the human-machine dialogue system, the natural language understanding apparatus is one of the most frequently changed modules, and a core component of the natural language understanding apparatus is a natural language understanding model.

Therefore, how to conveniently maintain the natural language understanding model becomes a key factor that affects user experience.

SUMMARY

Embodiments of the present disclosure provide a model management apparatus and method, a data management apparatus and method, an intelligent dialogue system, an electronic device, and a storage medium, which realize decoupling between the model and the model application apparatus, therefore facilitating maintenance and management of the model, improving maintenance and management efficiency, and reducing design complexity of the model application apparatus.

According to a first aspect, an embodiment of the present disclosure provides a model management apparatus, which includes a model storage module and a model update module; where the model storage module is configured to store at least one functional model; and the model update module is connected to the model storage module, and is configured to obtain a target functional model to be updated from the model storage module according to a received update instruction, perform functional update on the target functional model to be updated based on a target model data set, and transmit an updated target functional model to the model storage module for storage;

where the target functional model is called by a model application apparatus to cause the model application apparatus to implement a set function, and the model application apparatus and the model management apparatus are set up independently of each other.

According to a second aspect, an embodiment of the present disclosure further provides a model management method, which includes:

receiving, through a model update module, an update instruction of a target functional model;

obtaining, according to the update instruction, a target functional model to be updated from a model storage module, and performing, based on a target model data set, functional update on the target functional model to be updated; and transmitting an updated target functional model to the model storage module for storage;

where the target functional model is called by a model application apparatus to cause the model application apparatus to implement a set function, and the model application apparatus and the model management apparatus are set up independently of each other.

According to a third aspect, an embodiment of the present disclosure further provides a data management apparatus, which includes a database module and a regression test module;

the database module is configured to store a model data set to provide, when a model update module updates a target functional model, the model update module with a target model data set used for update;

the regression test module is configured to obtain, when a regression test instruction is received, a target test case set from the database module according to the regression test instruction, and test a set function of a model application apparatus based on the target test case set to test compatibility between an updated target functional model and an associated functional model thereof;

where the set function of the model application apparatus is implemented based on the updated target functional model and at least one associated functional model of the target functional model.

According to a fourth aspect, an embodiment of the present disclosure further provides a data management method, which includes:

in a case that a model update module updates a target functional model, providing, through a database module, the model update module with a target model data set used for update;

in a case that a regression test instruction is received through a regression test module, obtaining, through the regression test module, a target test case set from the database module according to the regression test instruction, and testing a set function of a model application apparatus based on the target test case set to test compatibility between an updated target functional model and an associated functional model thereof;

where the set function of the model application apparatus is implemented based on the updated target functional model and at least one associated functional model of the target functional model.

According to a fifth aspect, an embodiment of the present disclosure further provides an intelligent dialogue system, which includes the model management apparatus according to the first aspect, the data management apparatus according to the third aspect, an offline model application apparatus and an online model application apparatus.

According to a sixth aspect, an embodiment of the present disclosure further provides an electronic device, including:

one or more processors; and a storage apparatus, configured to store one or more programs, where the one or more programs, when executed by the one or more processors, cause the one or more processors to implement the model management method or the data management method according to any of the embodiments of the present disclosure.

According to a seventh aspect, an embodiment of the present disclosure further provides a storage medium containing computer executable instructions, which, when executed by a computer processor, are used to execute the model management method or the data management method according to any of the embodiments of present disclosure.

According to an eighth aspect, an embodiment of the present disclosure further provides a computer program product which includes a computer program stored in a readable storage medium, one or more processors of an electronic device can read the computer program from the readable storage medium, and the one or more processors execute the computer program to cause the electronic device to execute the model management method or the data management method according to any of the embodiments of the present disclosure.

According to a ninth aspect, an embodiment of the present disclosure further provides a computer program stored in a readable storage medium, one or more processors of a device can read the computer program from the readable storage medium, and the one or more processors execute the computer program to cause the electronic device to execute the model management method or the data management method according to any of the embodiments of the present disclosure.

The model management apparatus provided by the embodiments of the present disclosure includes: a model storage module and a model update module, where the model update module is connected to the model storage module, and is configured to obtain, according to a received update instruction, a target functional model to be updated from the model storage module, perform functional update on the target functional model to be updated based on a target model data set, and transmit the updated target functional model to the model storage module for storage; where the target functional model is called by the model application apparatus to cause the model application apparatus to implement a set function, and the model application apparatus and the model management apparatus are set up independently of each other. Through the above technical solution, decoupling between the model and the model application apparatus is realized, thereby facilitating the maintenance and management of the model, improving the maintenance and management efficiency and reducing the design complexity of the model application apparatus.

BRIEF DESCRIPTION OF THE DRAWINGS

In conjunction with the accompanying drawings and with reference to the following specific embodiments, the above and other features, advantages and aspects of various embodiments of the present disclosure will become more apparent. Throughout the drawings, identical or similar reference signs refer to identical or similar elements. It should be understood that the drawings are schematic and the components and elements are not necessarily drawn to scale.

FIG. 1 is a schematic structural diagram of a model management apparatus provided by Embodiment I of the present disclosure.

FIG. 2 is a schematic structural diagram of another model management apparatus provided by Embodiment I of the present disclosure.

FIG. 3 is a schematic flowchart of a model management method provided by Embodiment II of the present disclosure.

DESCRIPTION OF EMBODIMENTS

Figure 4:
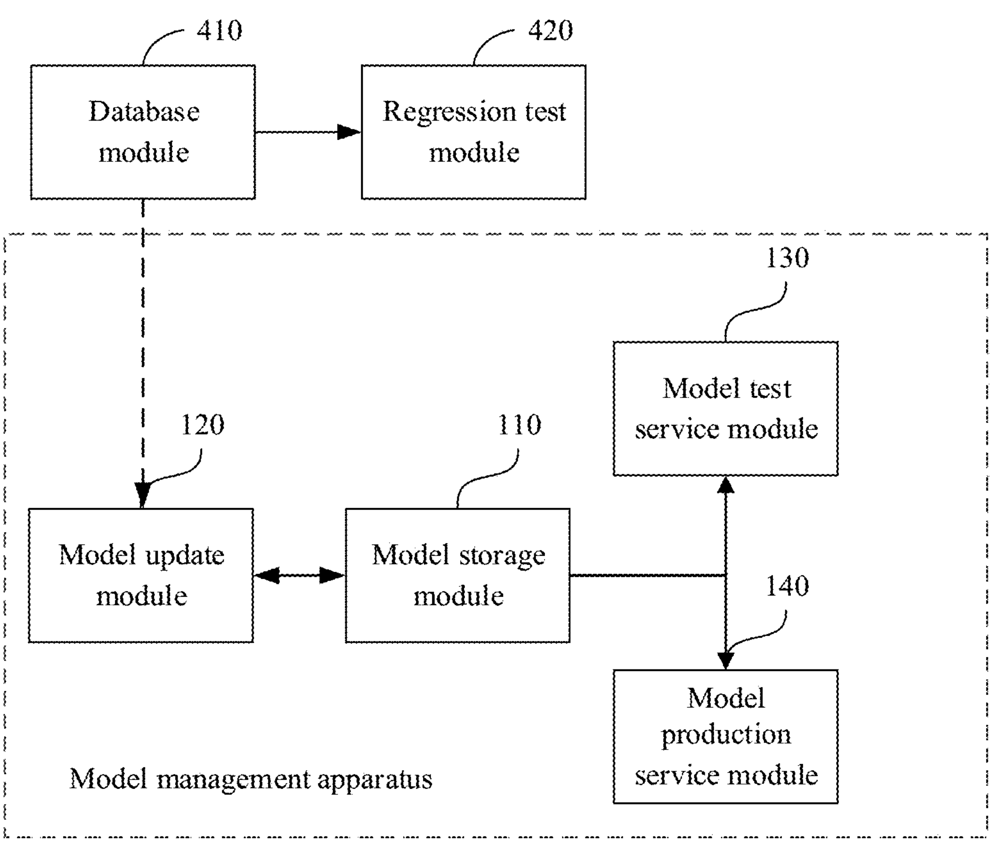
FIG. 4 is a schematic structural diagram of a data management apparatus provided by Embodiment III of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth herein. On the contrary, these embodiments are provided for a more thorough and complete understanding of the present disclosure. It should be understood that the drawings and embodiments of the present disclosure are only for illustrative purposes, and are not intended to limit the scope of protection of the present disclosure.

It should be understood that steps described in the method embodiments of the present disclosure may be performed in different order and/or in parallel. In addition, the method embodiments may include additional steps and/or omit a step shown, and the scope of the present disclosure is not limited in this respect.

As used herein, the term “including” and its variations are open including, that is, “including but not limited to”. The term “based on” indicates “based at least in part”. The term “an embodiment” indicates “at least one embodiment”. The term “another embodiment” indicates “at least one further embodiment”. The term “some embodiments” indicates “at least some embodiments”. Relevant definitions of other terms will be given in the following description.

It should be noted that the concepts of “first” and “second” mentioned in the present disclosure are only used to distinguish different apparatuses, modules or units, and are not used to limit the order or interdependence of the functions performed by these apparatuses, modules or units.

It should be noted that the modifications of “one” and “multiple” mentioned in the present disclosure are illustrative rather than restrictive, and those skilled in the art should understand that unless otherwise expressly stated in context, they should be understood as "one or more".

Embodiment I

FIG. 1 is a schematic structural diagram of a model management apparatus provided by Embodiment I of the present disclosure. As shown in FIG. 1, the model management apparatus includes: a model storage module 110 and a model update module 120.

The model storage module 110 is configured to store at least one functional model. The model update module 120 is connected to the model storage module 110, and is configured to obtain, according to a received update instruction, a target functional model to be updated from the model storage module 110, perform functional update on the target functional model to be updated based on a target model data set, and transmit an updated target functional model to the model storage module 110 for storage; where the target functional model is called by the model application apparatus to cause the model application apparatus to implement a set function, and the model application apparatus and the model management apparatus are set up independently of each other. The model update module 120 performs the functional update on the target functional model to be updated based on the target model data set, which may specifically be that the model update module 120 preforms re-training and learning on the target functional model to be updated based on the target model data set.

Decoupling the functional model from the model application apparatus facilitates operations, such as update, addition and deletion, of the functional model and reduces the design complexity of the model application apparatus. The management operations, such as update, addition and deletion, of the functional model are performed through the model management apparatus that is independent of the model application apparatus, which improves the efficiency in maintenance and management of the functional model. If the functional model is coupled with the model application apparatus, the model application apparatus is required to be able to load the model, which increases the design complexity of the model application apparatus; otherwise, problems of inconvenient model maintenance and low efficiency will occur. Specifically, if one of functional models needs to be updated, the model application apparatus needs to obtain the functional model to be updated first, and if the model application apparatus is able to load dynamically, the functional model to be updated is loaded into the memory of the model application apparatus, and then the update operation is performed. If the model application apparatus is not able to load dynamically, it is necessary to load the functional model to be updated by restarting. If a functional model is required to be newly added, configuration information for calling the newly-added functional model is required to be added to the model application apparatus. The model application apparatus needs to obtain the newly-added functional model first, and if the model application apparatus is able to dynamically load the model, the newly-added functional model is loaded into the memory of the model application apparatus, and configuration information for calling the newly-added functional model is added. If the model application apparatus is not able to load the model, restarting is required to load the newly-added functional model and adding the configuration information for calling the newly-added functional model. However, the requirement on the model application apparatus to have the capability to load the functional model greatly increase the design difficulty of the model application apparatus. Taking the functional model being a machine learning model as an example, there are many kinds of basic frameworks for the machine learning model, and models under different frameworks require different loading methods. If the model application apparatus has the loading capability, the model application apparatus needs to integrate the basic frameworks of all machine learning models that may be required, and then the loading module is developed according to the methods of loading the models under the specific frameworks. However, by decoupling the functional model from the model application apparatus, the model application apparatus does not need to integrate various basic frameworks, and a separate loading module is not required to be developed either, and only related services for calling the models are required, thereby not only facilitating the update, addition and deletion of the functional model, but also reducing the design complexity of the model application apparatus.

Further, please refer to the schematic structural diagram of another model management apparatus shown in FIG. 2. The model management apparatus further includes a model test service module 130 and a model production service module 140. The model test service module 130 is connected to the model storage module 110, and is configured to load, in a case that a first loading task instruction is received, the target functional model and an associated functional model of the target functional model from the model storage module 110, so that an offline model application apparatus calls, in a test phase, the target functional model and the associated functional model of the target functional model from the model test service module 130 to implement the set function.

The model production service module 140 is configured to load, in a case that a second loading task instruction is received, the updated target functional model and the associated functional model of the target functional model from the model storage module 110, so that an online model application apparatus calls, in a use phase, the updated target functional model and the associated functional model of the target functional model from the model production service module 14, to implement the set function; where the set function is implemented based on the updated target functional model and the associated functional model of the target functional model.

It can be understood that when the target functional model is updated, its updated function is required to be tested, and the updated target functional model is put on line and called by the model application apparatus to implement the set function only after passing the test. To standardize the process of model management and maintenance, in the test phase, the updated target functional model and the associated functional model of the target functional module are stored in the model test service module 130. In the test process, the offline model application apparatus calls the target functional model and the associated functional model of the target functional model from the model test service module 130 to implement the set function, so as to test a specific function implemented by the updated target functional model. After passing the test, the updated target functional model and the associated functional module thereof are both stored into the module production service module 140, so that in a use phase, the online module application module calls the updated target functional module and the associated functional module of the target functional module form the module production service module 140 to implement the set function.

For example, in an intelligent dialogue scenario, it is assumed that the model application apparatus is a natural language understanding apparatus, and the target functional model may specifically be a vertical domain categorization model, a domain intention categorization model or a slot sequence annotation model. The function of the vertical domain categorization model is to category a domain to which input information or query information belongs, where the domain includes, for example, a weather domain, a music domain, and a film domain. For example, the current input information or query information is "What will the weather be like tomorrow?", the input information is categorized by the vertical domain categorization model, and the obtained vertical domain to which the input information belongs is "weather domain". The function of the domain intention categorization model is to categorize the intention of input information. For example, the input information is "What will the weather be like tomorrow?", and the input information is processed through the intention categorization model of the weather domain, and then, it can be obtained that the intention of the input information is "Get the weather forecast for tomorrow". The slot sequence annotation model is configured to annotate the slot of the input information. Still taking the input information of "What will the weather be like tomorrow?" as an example, an annotation sequence "Time slot-tomorrow" may be obtained through the processing of the slot sequence annotation model. When the natural language understanding apparatus tries to understand the input information in natural language, that is, the set function is a natural language understanding function, which needs to be implemented based on the vertical domain categorization model, the domain intention categorization model and the slot sequence annotation model, it is assumed that only the target functional model "vertical domain categorization model" has been updated at present, and then the associated functional models of the target functional model are the "domain intention categorization model" and the "slot sequence annotation model". When the update operation of the target functional model "vertical domain categorization model" is completed, the target functional model, i.e., "vertical domain categorization model", and the associated functional models, i.e., "domain intention categorization model" and "slot sequence annotation model", of the target functional model are loaded from the model storage module 110 to the model test service module 130, so that the offline model application apparatus calls, in the test phase, the target functional model and the associated functional models of the target functional model from the model test service module 130 to implement the set function.

The model management apparatus provided by the embodiment of the present disclosure realizes standardized management and maintenance of the functional model, improving model maintenance efficiency, and the decoupling of the model from the model application apparatus facilitates the maintenance and management of the model, and reduces the design complexity of the model application apparatus.

Embodiment II

FIG. 3 is a schematic flowchart of a model management method provided by Embodiment II of the present disclosure. As shown in FIG. 3, the method includes the following steps:

Step 310, receive an update instruction of a target functional model through a model update module.

The update instruction may be triggered by operation and maintenance personnel of a model management apparatus through a specific human-machine interaction interface. The target functional model refers to a model that can implement a specific function; for example, in the application field of human-machine dialogue, the target functional model may specifically be a vertical domain categorization model, a domain intention categorization model and a slot sequence annotation model. The function of the vertical domain categorization model is to categorize a domain to which input information or query information belongs. The domain includes, for example, a weather domain, a music domain, a film domain. For example, in a case that the current input information or query information is "What will the weather be like tomorrow?", the input information is categorized by the vertical domain categorization model, and the obtained vertical domain to which the input information belongs is "weather domain". The function of the domain intention categorization model is to categorize the intention of input information. For example, the input information is "What will the weather be like tomorrow?", and the input information is processed through the intention categorization model of the weather domain, and then it can be obtained that the intention of the input information is "Get the weather forecast for tomorrow". The slot sequence annotation model is configured to annotate the slot of the input information. Still taking the input information of "What will the weather be like tomorrow?" as an example, the annotation sequence "Time slot-tomorrow" may be obtained through the processing of the slot sequence annotation model.

In the application scenario of human-machine dialogue, the update instruction of the target functional model may be triggered through the human-machine interaction interface of the intelligent dialogue platform.

Step 320, obtain, according to the update instruction, a target functional model to be updated from a model storage module, and perform functional update on the target functional model to be updated based on a target model data set.

The functional update may refer to the update of the version of the functional model, and the essence of functional update is to improve and update the function of the functional model. Taking the target functional model being a neural network-based functional model as an example, the update operation may be to perform retraining and learning on an old version of the target functional model by using the new training data set to update the function of the old version of the target functional model. The target model data set may be obtained from a set database or be uploaded by an engineer. For example, for a neural network model, the target model data set may be a training data set, a test data set or the like.

The target model data set may be obtained from the set database. The set database is configured to store a model data set used for training the functional model, and specifically, the model data set is stored in advance by a model management engineer. The model storage module stores various functional models required for implementing various functions of the model application apparatus. When a target functional model needs to be updated, the target functional model may be derived from the model storage module based on keyword matching. The keyword may be an identification word of the functional model, such as the name, or the target functional model may be obtained from the model storage module through ID of the functional model.

Step 330, transmit an updated target functional model to the model storage module for storage; where the target functional model is called by a model application apparatus to cause the model application apparatus to implement a set function, and the model application apparatus and the model management apparatus are set up independently of each other.

In order to distinguish different versions of a same target functional model, version information is typically included in the name of the target functional module when the target functional module is stored into the model storage module. For example, for the vertical domain intention categorization model, when it is stored in the model storage module, its name may be in a format of "vertical domain_model_type_version number", for example, for the intention categorization model of the weather domain, its name when it is stored may be "weather_intention_20200416163200".

Further, the method further includes:

receiving, through a model test service module, a first loading task instruction;

loading, according to the first loading task instruction, the target functional model and an associated functional model of the target functional model from the model storage module to the model test service module, so that an offline model application apparatus calls, in a test phase, the target functional model and the associated functional model of the target functional model from the model test service module to implement the set function;

receiving, through a model production service module, a second loading task instruction;

loading, according to the second loading task instruction, the updated target functional model and the associated functional model of the target functional model from the model storage module to the model production service module, so that an online model application apparatus calls, in a use phase, the updated target functional model and the associated functional model of the target functional model from the model production service module to implement the set function;

where the set function is implemented based on the updated target functional model and the associated functional model of the target functional model.

Specifically, a task scheduling module may be specially configured to schedule the update process of the functional model. For example, when a target functional model needs to be updated, an update instruction is transmitted to the model update module; after the update of the target functional model is completed, a first loading instruction is transmitted to the model test service module; when the target functional model needs to be tested, a test instruction is transmitted to a functional module in charge of testing; and when the target functional model passes the test, a second loading instruction is transmitted to the model production service module.

In the model management method provided by the embodiments of the present disclosure, an update instruction of a target functional model is received through a model update module; a target functional model to be updated is obtained from a model storage module according to the update instruction, and functional update is performed on the target functional model to be updated based on a target model data set; the updated target functional model is transmitted to the model storage module for storage. Through these technical means, standardized management and maintenance of the functional model is realized and the efficiency in model maintenance is improved.

Embodiment III

FIG. 4 is a schematic structural diagram of a data management apparatus provided by Embodiment III of the present disclosure. The data management apparatus corresponds to and work together with the model management apparatus described in the above embodiment to realize standardized management of the functional model. As shown in FIG. 4, the data management apparatus includes a database module 410 and a regression test module 420.

The database module 410 is configured to store a model data set to provide a model update module 120 with a target model data set used for update when the model update module 120 updates a target functional model. The database module 410 further stores a test case set for performing a regression test on the target functional model.

The regression test module 420 is configured to obtain a target test case set from the database module 410 according to a regression test instruction when the regression test instruction is received, and test a set function of a model application apparatus based on the target test case set to test compatibility between an updated target functional model and an associated functional model thereof; where the set function of the model application apparatus is implemented based on the updated target functional model and at least one associated functional model of the target functional model.

The set function of the model application apparatus is tested based on the target test case set to test the compatibility between the updated target functional model and the associated functional model thereof, which includes:

for each test case in the target test case set, transmitting input information of a current test case to an offline model application apparatus, to cause the offline model application apparatus to call, based on the input information, the updated target functional model and the associated functional model of the target functional model from the model test service module, to obtain an output result; where the target functional model and the associated functional model of the model test service module are loaded from the model storage module after the update of the target functional model is completed;

comparing the output result with output information of the current test case; and determining a test result according to a comparison result.

Figure 5:
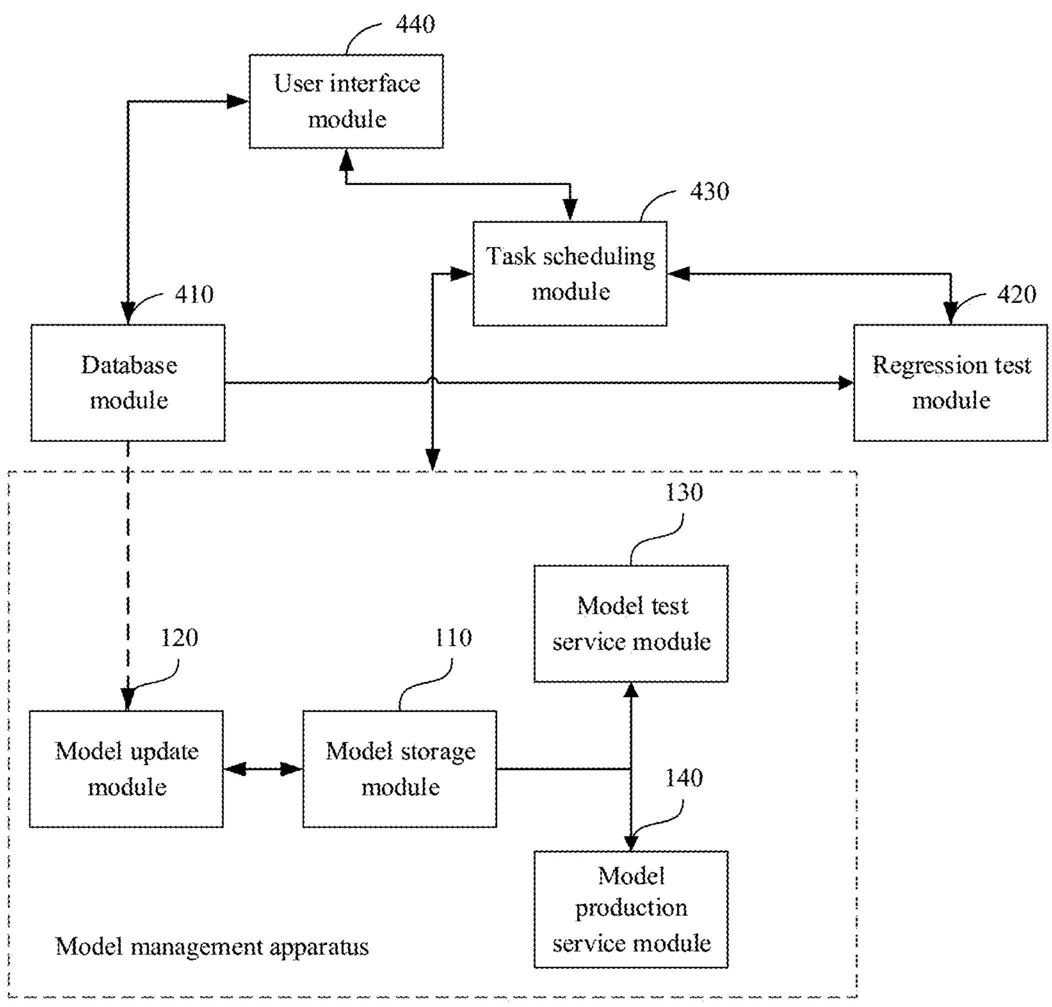
FIG. 5 is a schematic structural diagram of another data management apparatus provided by Embodiment III of the present disclosure.

Further, please refer to the schematic structural diagram of another data management apparatus shown in FIG. 5. The data management apparatus further includes: a task scheduling module 430 and a user interface module 440.

The task scheduling module 430 is configured to schedule tasks executed by the regression test module 420 and modules in the model management apparatus, according to a received user instruction. The user interface module 440 is configured to receive the user instruction, and manage data stored in the database module according to the user instruction, such as adding new model data sets and test case sets, or deleting historical model data sets and test case sets; and/or transmit the user instruction to the task scheduling module 430 to trigger the task scheduling module 430 to schedule the tasks executed by the regression test module 420 and the modules in the model management apparatus.

The data management apparatus provided in this embodiment is configured corresponding to the model management apparatus provided in the above embodiment, and includes: a database module for providing a model data set for the model management apparatus, a regression test module for performing a regression test on the target functional model, a task scheduling module for scheduling tasks executed by the modules in the model management apparatus, and a user interface module for human-machine interaction, which achieves the purpose of collection and management of the model data set and the regression test case set, and regression testing of the target functional model. Upon the regression test of the target functional model, update accuracy of the target functional model is improved, and updated function is ensured to be usable. In addition, the purpose of scheduling the tasks executed by the modules in the model management apparatus is achieved through the task scheduling module.

Embodiment IV

Figure 6:
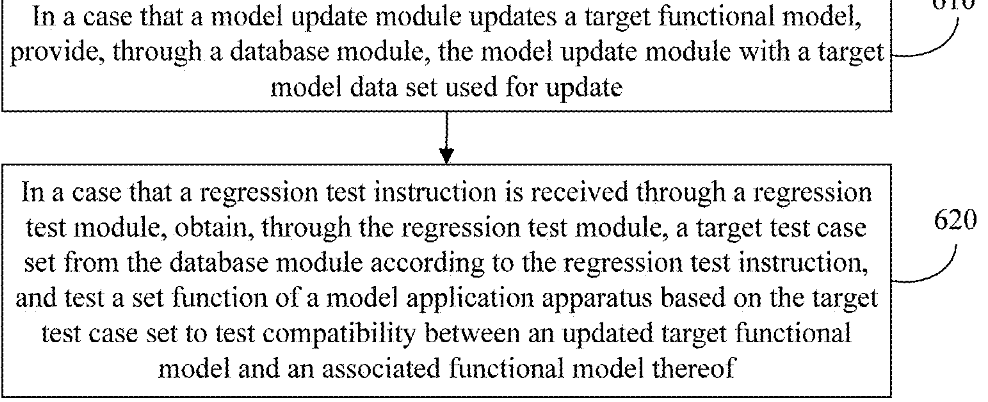
FIG. 6 is a schematic flowchart of a data management method provided by Embodiment IV of the present disclosure.

FIG. 6 is a schematic flowchart of a data management method provided by Embodiment IV of the present disclosure. As shown in FIG. 6, the method includes the following steps:

Step 610, in a case that a model update module updates a target functional model, provide, through a database module, the model update module with a target model data set used for update.

Step 620, in a case that a regression test instruction is received through a regression test module, obtain, through the regression test module, a target test case set from the database module according to the regression test instruction, and test a set function of a model application apparatus based on the target test case set to test compatibility between an updated target functional model and an associated functional model thereof;

The set function of the model application apparatus is implemented based on the updated target functional model and at least one associated functional model of the target functional model.

Illustratively, the set function of the model application apparatus is tested based on the target test case set to test compatibility between the updated target functional model and the associated functional model thereof, which includes:

for each test case in the target test case set, transmitting input information of a current test case to an offline model application apparatus, to cause the offline model application apparatus to call, based on the input information, the updated target functional model and the associated functional model of the target functional model from a model test service module, to obtain an output result; where the target functional model and the associated functional model of the model test service module are loaded from the model storage module after update of the target functional model is completed;

comparing the output result with output information of the current test case; and determining a test result according to a comparison result.

Further, the method further includes at least one of the following:

- in a case that a model update instruction is received through a task scheduling module, transmitting an update instruction to the model update module;
- in a case that it is detected through the task scheduling module that update of the target functional model is completed, transmitting a first loading task instruction to the model test service module, to cause the model test service module to load, from a model storage module, the target functional model and the associated functional model of the target functional model;
- in a case that a test instruction is received through the task scheduling module, transmitting the regression test instruction to the regression test module;
- in a case that it is detected through the task scheduling module that the test is passed, transmitting a second loading task instruction to a model production service module, to cause the model production service module to load, from the model storage module, the updated target functional model and the associated functional model of the target functional model, so that an online model application apparatus calls, in a use phase, the updated target functional model and the associated functional model of the target functional model from the model production service module to implement the set function.

In addition, the method further includes:

- receiving, through a user interface module, a user instruction, and managing data stored in the database module according to the user instruction, and/or transmitting the user instruction to the task scheduling module to trigger the task scheduling module to schedule tasks executed by the regression test module and modules in the model management apparatus.

In the technical solution of this embodiment, in a case that the model update module updates the target functional model, the target model data set used for update is provided for the model update module through the database module; in a case that the regression test instruction is received by the regression test module, the target test case set is obtained from the database module through the regression test module according to the regression test instruction, and the set function of the model application apparatus is tested based on the target test case set to test compatibility between the updated target functional model and the associated functional model thereof. Through the above technical means, the purpose of providing the model update module with the updated target model data set used for update and the purpose of performing the regression test on the target functional model are achieved, and the reliability of model update is improved, then the reliability of the model application apparatus is improved, thereby reducing the risk of functional failure of the model application apparatus caused by an update error of the functional model.

Embodiment V

Figure 7:
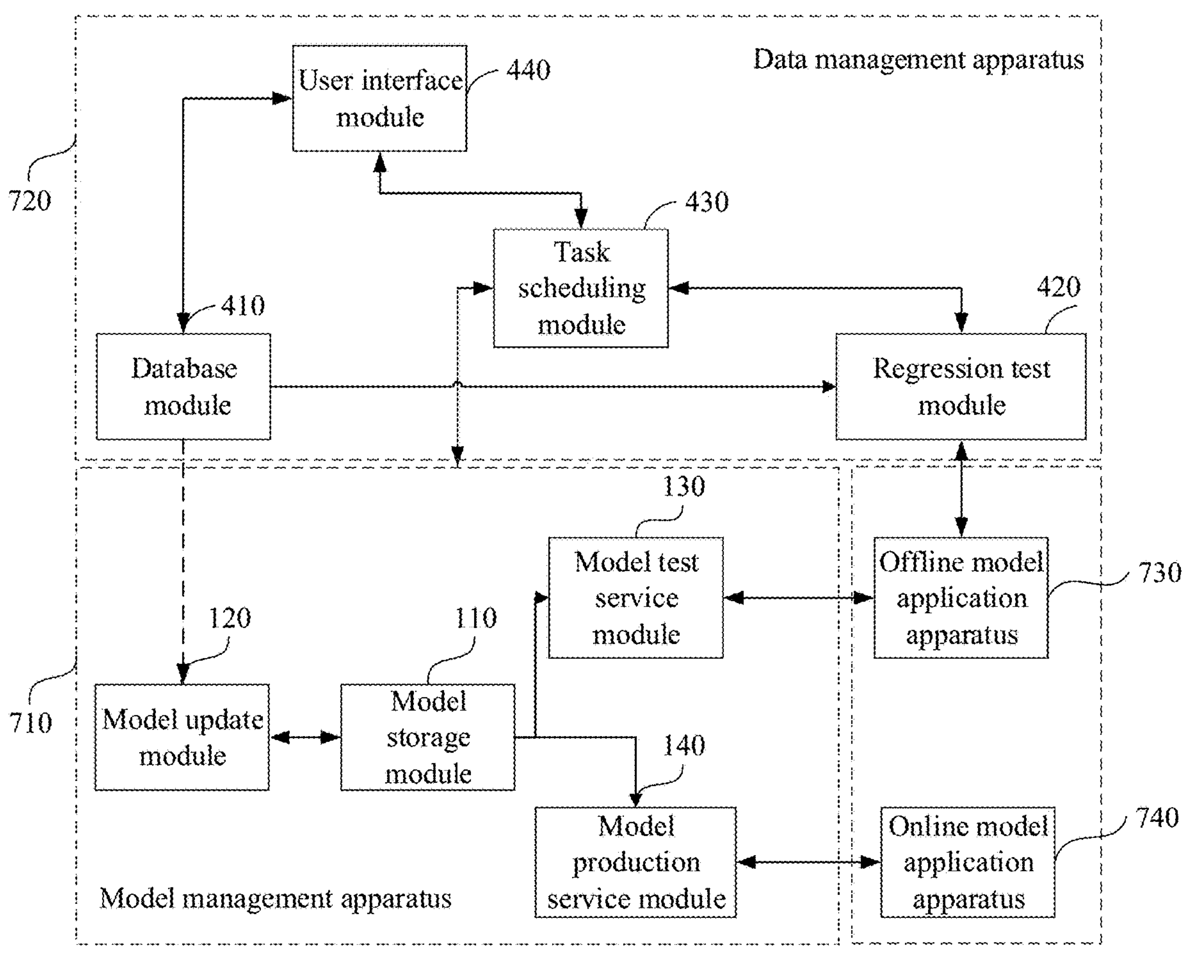
FIG. 7 is a schematic structural diagram of an intelligent dialogue system provided by Embodiment V of the present disclosure.

FIG. 7 shows an intelligent dialogue system provided by Embodiment V of the present disclosure. As shown in FIG. 7, the system includes: a model management apparatus 710, a data management apparatus 720, an offline model application apparatus 730 and an online model application apparatus 740 described in the above embodiments.

For example, the model application apparatus is a natural language understanding apparatus. The natural language understanding apparatus is mainly used to parse a vertical domain, a domain intention and a slot of a query type version, and usually adopts modular pipeline architecture. Correspondingly, a target functional model includes at least one of the following: a vertical domain categorization model, a domain intention categorization model and a slot sequence annotation model, and the set function includes a natural language understanding function. The natural language understanding apparatus needs to perform natural language understanding of the input information based on the vertical domain categorization model, the domain intention categorization model and the slot sequence annotation model. It is assumed that the target functional model is the "vertical domain categorization model", and then, the associated functional models of the target functional model are the "domain intention categorization model" and the "slot sequence annotation model".

Figure 8:
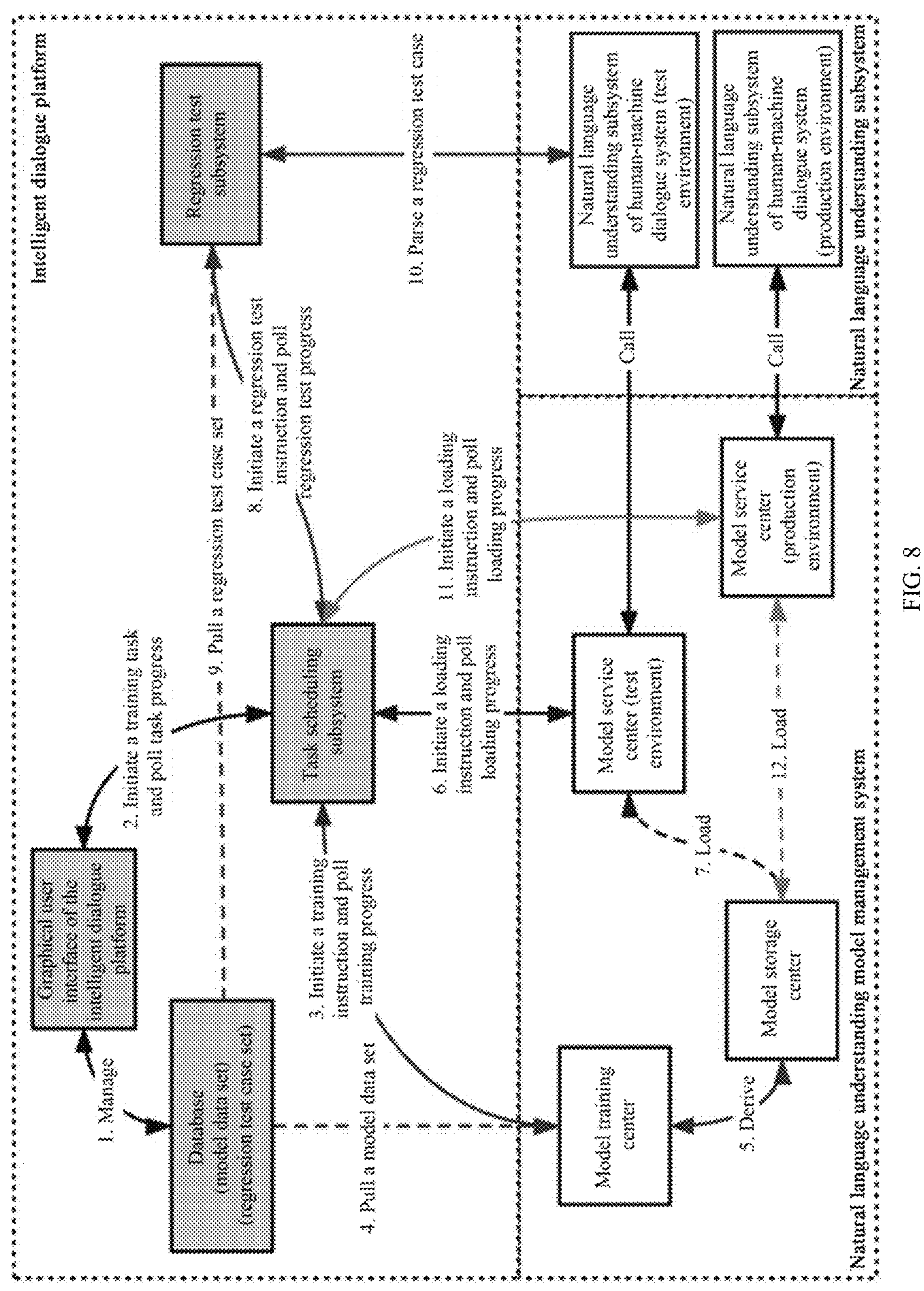
FIG. 8 is a schematic structural diagram of another intelligent dialogue system provided by Embodiment V of the present disclosure.

Typically, a model test is carried out after the model is trained. For example, after the domain intention categorization model of the vertical weather domain is retrained, a new domain intention categorization model is tested immediately using a test data set that has a same distribution as the training data set. The model application apparatus being a natural language understanding subsystem is taken as an example in the following to describe the process of maintaining and managing the functional model required by the natural language understanding subsystem according to the model management method and the data management method provided by the embodiments of the present disclosure:

In practical business applications, another system architecture diagram as shown in FIG. 8 is usually divided into three parts: an intelligent dialogue platform (corresponding to the above data management apparatus), a natural language understanding model management system (corresponding to the above model management apparatus) and a natural language understanding subsystem (corresponding to the above model application apparatus).

The intelligent dialogue platform includes a graphical user interface of the intelligent dialogue platform (corresponding to the user interface module in the data management apparatus), through which relevant staff manage the model data set and regression test case set which are required for model update. Taking a vertical domain categorization model as an example, the model data set is divided according to three tasks involving vertical domain categorization, domain intention categorization and slot sequence annotation, including a vertical domain categorization data set, a domain intention categorization data set and a slot sequence annotation data set. The data set of each task is further divided into: a training data set, a test data set and a development data set. According to different types of tasks, each piece of data in the data set includes Query and a correct vertical domain or a correct domain intention or a correct slot sequence annotation corresponding to Query. The regression test case set is composed of regression test cases of all vertical domains supported by the human-machine dialogue system. Each regression test case includes Query and a correct vertical domain, a correct domain intention and a correct slot sequence annotation corresponding to Query. At the same time, the update instruction of the target functional model is trigger through the graphical user interface. The intelligent dialogue platform further includes a database (corresponding to the database module in the data management apparatus), a task scheduling subsystem (corresponding to the task scheduling module in the data management apparatus) and a regression test subsystem (corresponding to the regression test module in the data management apparatus), where the database is configured to store the model data set and the regression test case set required for model update; and the task scheduling subsystem is configured to schedule tasks in the update process of the model. The regression test subsystem is configured for performing the regression test.

The natural language understanding model management system includes a model training center (corresponding to the model update module in the model management apparatus), a model storage center (corresponding to the model storage module in the model management apparatus), a test environment model service center (corresponding to the model test service module in the model management apparatus) and a production environment model service center (corresponding to the model production service module in the model management apparatus); the model training center is configured to train the functional model to be updated; the model storage center is configured to store various functional models; the test environment model service center is configured to store the functional model of which update is completed currently, and the associated functional model thereof, to facilitate them being called in the regression test process; the production environment model service center is configured to store the functional model of which update is completed currently, and the associated functional model thereof, after the regression test is passed, to facilitate implementation of the function of the online system.

The natural language understanding subsystem includes the natural language understanding subsystem of a test environment (corresponding to the above offline model application apparatus) and the natural language understanding subsystem of a production environment (corresponding to the above online model application apparatus); where the natural language understanding subsystem of the test environment is used in the regression test, and can be understood as an offline system, and its input object is not a real-time requirement of the user; while the natural language understanding subsystem of the production environment is used online, that is, it is user-oriented, its input object is a real-time requirement of the user, and it provides services for the user in real time.

Based on the above system architecture, the model management process specifically includes the following steps:

Step 1, a training task for a target functional model is initiated to the task scheduling subsystem through the graphical user interface of the intelligent dialogue platform. The task scheduling subsystem creates the training task and returns a task ID to the graphical user interface of the intelligent dialogue platform. The graphical user interface of the intelligent dialogue platform may regularly poll the task status according to the task ID until the task succeeds or fails. When steps 2 to 11 are all successfully executed, the task scheduling subsystem sets the task status of the training task to be successful, and when any of the steps from steps 2 to 11 fails or has an exception occurred therein, the task scheduling subsystem sets the task status of the training task to be failed.

Step 2, the task scheduling subsystem of the intelligent dialogue platform initiates a training task of the target functional model to the model training center of the natural language understanding model management system. The model training center of the natural language understanding model management system creates a task and returns a task ID to the task scheduling subsystem. The task scheduling subsystem may regularly poll the task status according to the task ID until the task succeeds or fails.

Step 3, the model training center of the natural language understanding model management system pulls, from the database of the intelligent dialogue platform, a model data set that matches the target functional model, and trains the target functional model. For example, when the currently initiated training task is for the domain intention categorization model of the vertical weather domain, the training data set, the test data set and the development data set for the domain intention categorization model of the vertical weather domain are pulled from the database of the intelligent dialogue platform.

Step 4, after model training is completed, the model training center of the natural language understanding model management system may export the trained target functional model to the model storage center of the natural language understanding model management system, and set the task status of the training task to be successful. When either step 3 or step 4 fails or has an exception occurred therein, the task status of the training task is set to be failed and no further steps are taken.

Step 5, after the task scheduling subsystem of the intelligent dialogue platform regularly polls, according to the task ID provided by the model training center, that the training task is successful, it initiates, to the model service center of the test environment, a task instruction of loading the trained target functional model. The model service center of the test environment creates a task and returns a task ID, and the task scheduling subsystem may regularly poll the task status according to the task ID until the task succeeds or fails.

Step 6, the model service center of the test environment may search corresponding models (the target functional model and its associated functional model) from the model storage center and reload them, and set the task status of the loading task to be successful after the loading is completed. When an exception occurs in step 6, the task status of the loading task is set to be failed and no further steps are taken.

Step 7, after the task scheduling subsystem regularly polls, according to the task ID provided by the model service center of the test environment, that the task status of the loading task is successful, it initiates a regression test task instruction to the regression test subsystem, the regression test subsystem creates a regression test task and returns a task ID, and the task scheduling subsystem may regularly poll the task status according to the task ID until the task succeeds or fails.

Step 8, the regression test subsystem may pull, from the database of the intelligent dialogue platform, a regression test case set and execute a regression test.

Step 9, during the regression test, for each regression test case, the regression test subsystem may call, according to Query of the regression test case, the natural language understanding subsystem of the human-machine dialogue system of the test environment. Although no changes have been made to the natural language understanding subsystem of the human-machine dialogue system of the test environment, the model service center of the test environment called by the natural language understanding subsystem of the human-machine dialogue system of the test environment has loaded the latest model. The regression test subsystem may compare the correct vertical domain, correct domain intention and correct slot position of each regression test case with the parse result of the natural language understanding subsystem of the human-machine dialogue system in the test environment. Only if a correct rate reaches a regression test pass threshold, the regression test is passed. After the regression test is passed, the regression test subsystem may set the task status of the regression test task to be successful. If an exception occurs in either step 8 or step 9, or the regression test is not passed, the task status of the regression test task is set to be failed and no further steps are taken.

Step 10, after the task scheduling subsystem regularly polls, according to the task ID provided by the regression test subsystem, that the regression test task is successful, it initiates, to the model service center of the production environment, a task instruction of loading the model. The model service center of the production environment creates a task and returns a task ID, and the task scheduling subsystem may regularly poll the task status according to the task ID until the task succeeds or fails.

Step 11, the model service center of the production environment may search corresponding models (the target functional model and its associated functional model) from the model storage center and reload them, and set the task status of the loading task to be successful after the loading is completed. When an exception occurs in step 11, the task status of the loading task is set to be failed.

The technical solution of the embodiment of the present disclosure provides the architecture of an intelligent dialogue platform, and a natural language understanding subsystem of a human-machine dialogue system and a natural language understanding model management system; a regression test subsystem is introduced into the above architecture to avoid the problem of human-machine dialogue system failure caused in the process of maintaining the natural language understanding model; in the above architecture, the natural language understanding model is decoupled from the natural language understanding subsystem of the human-machine dialogue system, so that the natural language understanding subsystem does not need to support the capability to load the natural language understanding model; and the natural language understanding model management system in the above architecture can provide a unified model management function for managing functional models in the human-machine dialogue system.

The intelligent dialogue system provided by the embodiment of the present disclosure may execute the model management method and the data management method provided by any of the embodiments of the present disclosure, and has corresponding functional modules for executing the methods and the beneficial effects.

It is worth noting that the units and modules included in the above system are only divided according to the functional logic, but are not limited to the above division, as long as the corresponding functions can be achieved; in addition, the specific names of the functional units are just for distinguishing them from each other and are not intended to limit the scope of protection of the embodiments of present disclosure.

Embodiment VI

Figure 9:
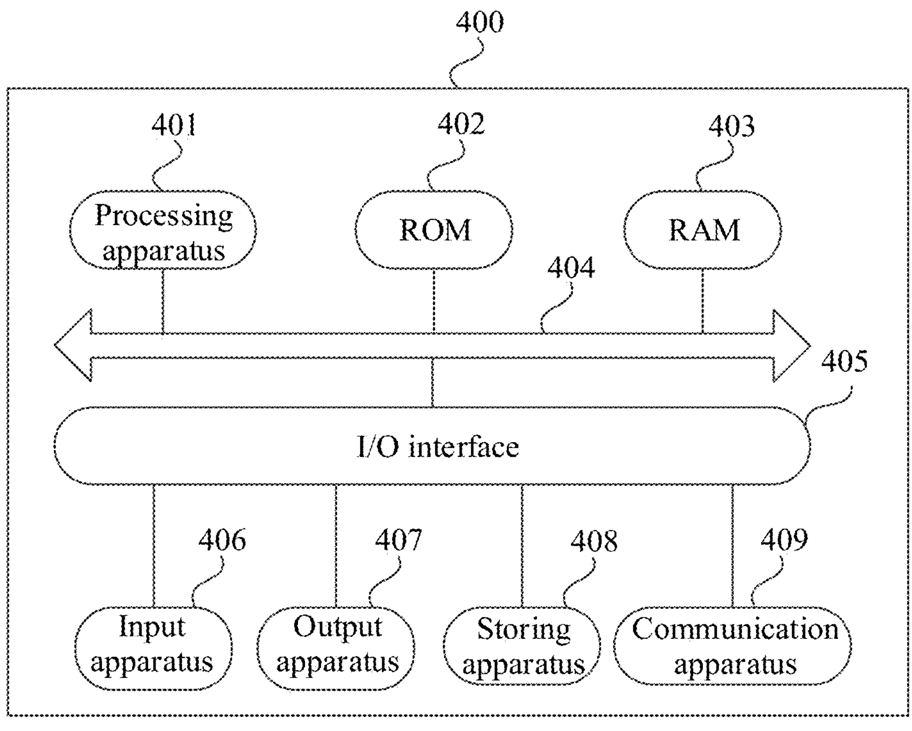
FIG. 9 is a schematic structural diagram of an electronic device provided by Embodiment VI of the present disclosure.

Referring to FIG. 9 below. FIG. 9 shows a schematic structural diagram of an electronic device 400 (for example, a terminal device or a server in FIG. 9) suitable for implementing the embodiments of the present disclosure. The terminal device in the embodiment of the present disclosure may include, but is not limited to, a mobile terminal such as a mobile phone, a laptop, a digital broadcast receiver, a PDA (personal digital assistant), a PAD (tablet, PAD), a PMP (portable multimedia player, PMP), an on-board terminal (for example, an on-board navigation terminal), and a fixed terminal such as a digital TV and a desktop computer. The electronic device shown in FIG. 9 is only an example, and should not impose any limitation on the function and scope of use of the embodiments of the present disclosure.

As shown in FIG. 9, the electronic device 400 may include a processing apparatus 401 (such as a central processing unit and a graphics processor), which may perform various appropriate actions and processing according to a program stored in a read-only memory (ROM) 402 or a program loaded from a storage apparatus 406 into a random-access memory (RAM) 403. The RAM 403 also stores various programs and data required for operation of the electronic device 400. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, for example, a touch screen, a touch panel, a keyboard, a mouse, a camera, a microphone, an accelerometer, a gyroscope; an output apparatus 407 including, for example, a liquid crystal display (LCD), a speaker, a vibrator; a storage apparatus 406 including, for example, a magnetic tape and a hard disk; and a communication apparatus 409. The communication apparatus 409 may allow the electronic device 400 to perform wireless or wired communication with other devices to exchange data. Although FIG. 9 shows the electronic device 400 with various apparatuses, it should be understood that it is not required to implement or have all the apparatuses shown. More or fewer apparatuses may be implemented or provided instead.

Particularly, according to an embodiment of the present disclosure, the process described above with reference to the flowchart may be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 409, or installed from the storage apparatus 406 or from the ROM 402. When the computer program is executed by the processing apparatus 401, the steps in the method of the embodiment of the present disclosure are executed to realize the above functions defined by the embodiment of the present disclosure.

The embodiment of the present disclosure further provides a computer program product, which includes: a computer program stored in a readable storage medium, from which one or more processors of an electronic device can read the computer program, and the one or more processors execute the computer program to cause the electronic device to execute the solution provided by any one of the above embodiments.

The embodiment of the present disclosure further provides a computer program, which is stored in a readable storage medium. One or more processors of an electronic device can read the computer program from the readable storage medium, and the one or more processors execute the computer program to cause the electronic device to execute the solution provided by any one of the above embodiments.

The terminal provided by the embodiment of the present disclosure and the model management method provided by the above embodiment belong to the same invention concept. For the technical details not described in detail in the embodiment of the present disclosure, reference may be made to the above embodiment, and the embodiment of the present disclosure has the same beneficial effects as the above embodiment.

Embodiment VII

The embodiment of the present disclosure provides a computer storage medium having a computer program stored thereon, and when the program is executed by a processor, the model management method or the data management method provided by the above embodiments is implemented.

It should be noted that the above computer-readable medium of the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, apparatus, or component, or a combination of any of the above. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in combination with an instruction execution system, apparatus, or device. In the present disclosure, however, the computer-readable signal medium may include a data signal propagated in baseband or as part of a carrier wave, and computer-readable program code is carried in the data signal. The data signal propagated in such a way may take various forms, including but not limited to an electromagnetic signal, an optical signal or any suitable combination of the above. The computer-readable signal medium may also be any computer-readable medium other than the computer-readable storage medium, which can transmit, propagate or transfer the program that is used by or in combination with the instruction execution system, apparatus, or device. The program code contained in the computer readable medium may be transmitted by any suitable medium, including but not limited to an electric wire, an optical cable, RF (radio frequency), etc., or any suitable combination of the above.

In some embodiments, the client and the server may communicate by using any currently known or future developed network protocol such as the HTTP (HyperText Transfer Protocol), and may be interconnected with any form or medium of digital data communication (for example, a communication network). Examples of the communication network include a local area network (LAN), a wide area network (WAN), the Internet and an end-to-end network (for example, the ad hoc end-to-end network), as well as any currently known or future developed networks.

The above computer readable medium may be contained in the above electronic device; or it may exist separately without being assembled into the electronic device.

The above computer readable medium carries one or more programs, which, when executed by the electronic device, cause the electronic device to:

receive, through a model update module, an update instruction of a target functional model;

obtain, according to the update instruction, a target functional model to be updated from a model storage module, and perform functional update on the target functional model to be updated based on a target model data set; and transmit an updated target functional model to the model storage module for storage;

where the target functional model is called by a model application apparatus to cause the model application apparatus to implement a set function, and the model application apparatus and the model management apparatus are set up independently of each other;

and in a case that the model update module updates the target functional model, provide, through a database module, the model update module with a target model data set used for update;

in a case that a regression test instruction is received through a regression test module, obtain a target test case set from the database module according to the regression test instruction, and test the set function of the model application apparatus based on the target test case set to test compatibility between the updated target functional model and an associated functional model thereof;

where the set function of the model application apparatus is implemented based on the updated target functional model and at least one associated functional model of the target functional model.

Program code used to implement the operations of the present disclosure may be written in one or more programming languages or their combinations, the programming languages including but not limited to object-oriented programming languages such as Java, Smalltalk, C++, and conventional procedural programming languages such as the "C" language or similar programming languages. The program code may be executed wholly or partly on a machine, executed as an independent software package, executed partly on a user computer and partly on a remote computer, or executed wholly on a remote computer or server. In the case of remote computer, the remote computer may be connected to a user computer through any kind of network, including a local area network (LAN) or a wide area network (WAN), or it may be connected to an external computer (for example, using an Internet service provider to connect through the Internet).

The flowchart and block diagram in the accompany drawings illustrate possible architecture, features, and operations of the system, method, and computer program product according to the embodiments of the present disclosure. In this regard, each block in the flowchart or block diagram may represent a module, a program segment, or part of code, which contain one or more executable instructions for implementing a specified logical function. It should also be noted that in some alternative implementations, the functions marked in the blocks may also occur in a different order than those marked in the drawings. For example, two consecutive blocks may actually be executed in parallel, basically, and sometimes they may be executed in a reverse order, depending on the functions involved. It should also be noted that each block in the block diagram and/or flowchart, and the combination of blocks in the block diagram and/or flowchart, may be implemented by a dedicated hardware-based system that performs specified functions or operations, or may be implemented by a combination of dedicated hardware and computer instructions.

The units involved in the embodiments described in the present disclosure may be implemented in software or hardware. The name of a unit does not constitute a limitation on the unit itself in some cases.

The functions described above herein may be performed at least in part by one or more hardware logic components. For example, without limitation, exemplary types of hardware logic components that may be used include: a field programmable gate array (FPGA), an application specific integrated circuit (ASIC), an application specific standard product (ASSP), a system-on-chip (SOC), a complex programmable logic apparatus (CPLD), etc.

In the context of the present disclosure, a machine-readable medium may be a tangible medium, which may contain or store a program for use by an instruction execution system, apparatus, or device, or for use in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or may include any suitable combination of the above. More specific examples of machine-readable storage media would include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, Example I provides a model management apparatus, including:

a model storage module and a model update module;

where the model storage module is configured to store at least one functional model; and the model update module is connected to the model storage module, and is configured to obtain, according to a received update instruction, a target functional model to be updated from the model storage module, perform functional update on the target functional model to be updated based on a target model data set, and transmit an updated target functional model to the model storage module for storage;

where the target functional model is called by a model application apparatus to cause the model application apparatus to implement a set function, and the model application apparatus and the model management apparatus are set up independently of each other.

According to one or more embodiments of the present disclosure, Example II provides a model management apparatus, further including: a model test service module, connected to the model storage module, and configured to load, in a case that a first loading task instruction is received, the target functional model and an associated functional model of the target functional model from the model storage module, so that an offline model application apparatus calls, in a test phase, the target functional model and the associated functional model of the target functional model from the model test service module to implement the set function;

where the set function is implemented based on the updated target functional model and the associated functional model of the target functional model.

According to one or more embodiments of the present disclosure, Example III provides a model management apparatus, optionally, further including: a model production service module, configured to load, in a case that a second loading task instruction is received, the updated target functional model and the associated functional model of the target functional model from the model storage module, so that an online model application apparatus calls, in a use phase, the updated target functional model and the associated functional model of the target functional model from the model production service module to implement the set function;

where the set function is implemented based on the updated target functional model and the associated functional model of the target functional model.

According to one or more embodiments of the present disclosure, Example IV provides a model management method, including: receiving an update instruction of a target functional model through a model update module;

obtaining, according to the update instruction, a target functional model to be updated from a model storage module, and performing functional update on the target functional model to be updated based on a target model data set; and transmitting an updated target functional model to the model storage module for storage;

where the target functional model is called by a model application apparatus to cause the model application apparatus to implement a set function, and the model application apparatus and a model management apparatus are set up independently of each other.

According to one or more embodiments of the present disclosure, Example V provides a model management method, further including: receiving, through a model test service module, a first loading task instruction;

loading, according to the first loading task instruction, the target functional model and an associated functional model of the target functional model from the model storage module to the model test service module, so that an offline model application apparatus calls, in a test phase, the target functional model and the associated functional model of the target functional model from the model test service module to implement the set function;

where the set function is implemented based on the updated target functional model and the associated functional model of the target functional model.

According to one or more embodiments of the present disclosure, Example VI provides a model management method, optionally, further including:

receiving, through a model production service module, a second loading task instruction;

loading, according to the second loading task instruction, the updated target functional model and the associated functional model of the target functional model from the model storage module to the model production service module, so that an online model application apparatus calls, in a use phase, the updated target functional model and the associated functional model of the target functional model from the model production service module to implement the set function;

where the set function is implemented based on the updated target functional model and the associated functional model of the target functional model.

According to one or more embodiments of the present disclosure, Example VII provides a data management apparatus, including:

a database module and a regression test module;

where the database module is configured to store a model data set to provide a model update module with a target model data set used for update in a case that the model update module updates a target functional model;

the regression test module is configured to obtain a target test case set from the database module according to a regression test instruction in a case that the regression test instruction is received, and test a set function of a model application apparatus based on the target test case set to test compatibility between an updated target functional model and an associated functional model thereof;

where a set function of the model application apparatus is implemented based on the updated target functional model and at least one associated functional model of the target functional model.

According to one or more embodiments of the present disclosure, Example VIII provides a data management apparatus, further including: a task scheduling module, where the task scheduling module is configured to schedule, according to a received user instruction, tasks executed by the regression test module and modules in a model management apparatus.

According to one or more embodiments of the present disclosure, Example IX provides a data management apparatus, further including:

a user interface module, configured to receive a user instruction, and manage data stored in the database module according to the user instruction, and/or transmit the user instruction to the task scheduling module to trigger the task scheduling module to schedule the tasks executed by the regression test module and the modules in the model management apparatus.

According to one or more embodiments of the present disclosure, Example IX provides a data management method, including:

in a case that a model update module updates a target functional model, providing, through a database module, the model update module with a target model data set used for update;

in a case that a regression test instruction is received through a regression test module, obtaining a target test case set from the database module according to the regression test instruction, and testing a set function of a model application apparatus based on the target test case set to test compatibility between an updated target functional model and an associated functional model thereof;

where the set function of the model application apparatus is implemented based on the updated target functional model and at least one associated functional model of the target functional model.

According to one or more embodiments of the present disclosure, Example XI provides a data management method, the testing the set function of the model application apparatus based on the target test case set to test compatibility between the updated target functional model and the associated functional model thereof, includes:

for each test case in the target test case set, transmitting input information of a current test case to an offline model application apparatus, to cause the offline model application apparatus to call, based on the input information, the updated target functional model and the associated functional model of the target functional model from a model test service module to obtain an output result; where the target functional model and the associated functional model of the model test service module are loaded from the model storage module after update of the target functional model is completed;

comparing the output result with output information of the current test case; and determining a test result according to a comparison result.

According to one or more embodiments of the present disclosure, Example XII provides a data management method, further including at least one of the following:

in a case that a model update instruction is received through a task scheduling module, transmitting an update instruction to the model update module;

in a case that it is detected through the task scheduling module that update of the target functional model is completed, transmitting a first loading task instruction to a model test service module to cause the model test service module to load, from a model storage module, the target functional model and the associated functional model of the target functional model;

in a case that a test instruction is received through the task scheduling module, transmitting the regression test instruction to the regression test module;

in a case that it is detected through the task scheduling module that the test is passed, transmitting a second loading task instruction to a model production service module, to cause the model production service module to load, from the model storage module, the updated target functional model and the associated functional model of the target functional model, so that an online model application apparatus calls, in a use phase, the updated target functional model and the associated functional model of the target functional model from the model production service module to implement the set function.

According to one or more embodiments of the present disclosure, Example XIII provides a data management method, further including:

receiving, through a user interface module, a user instruction, and managing data stored in a database module according to the user instruction, and/or transmitting the user instruction to the task scheduling module to trigger the task scheduling module to schedule tasks executed by the regression test module and modules in a model management apparatus.

According to one or more embodiments of the present disclosure, Example XIV provides an intelligent dialogue system, including the model management apparatus, the data management apparatus, the offline model application apparatus and the online model application apparatus described in any embodiment.

According to one or more embodiments of the present disclosure, Example XV provides an intelligent dialogue system, and the target functional model includes at least one of the following: a vertical domain categorization model, a domain intention categorization model, and a slot sequence annotation model; and the set function includes a natural language understanding function.

According to one or more embodiments of the present disclosure, Example XVI provides an electronic device, which includes:

one or more processors;

a storage apparatus, configured to store one or more programs, where the one or more programs, when executed by the one or more processors, cause the one or more processors to implement the model management method or the data management method described below:

receiving, through a model update module, an update instruction of a target functional model;

obtaining, according to the update instruction, a target functional model to be updated from a model storage module, and performing functional update on the target functional model to be updated based on a target model data set;

transmitting an updated target functional model to the model storage module for storage;

where the target functional model is called by a model application apparatus to cause the model application apparatus to implement a set function, and the model application apparatus and a model management apparatus are set up independently of each other.

in a case that the model update module updates the target functional model, providing, through a database module, the model update module with a target model data set used for update;

in a case that a regression test instruction is received through a regression test module, obtaining, through the regression test module, a target test case set from the database module according to the regression test instruction, and testing the set function of the model application apparatus based on the target test case set to test compatibility between the updated target functional model and an associated functional model thereof, where the set function of the model application apparatus is implemented based on the updated target functional model and at least one associated functional model of the target functional model.

According to one or more embodiments of the present disclosure, Example XVII provides a storage medium containing computer-executable instructions, which, when executed by a computer processor, are used to perform the model management method or data management method described below:

receiving, through a model update module, an update instruction of a target functional model;

obtaining, according to the update instruction, a target functional model to be updated from a model storage module, and performing functional update on the target functional model to be updated based on a target model data set;

transmitting the updated target functional model to the model storage module for storage;

where the target functional model is called by a model application apparatus to cause the model application apparatus to implement a set function, and the model application apparatus and a model management apparatus are set up independently of each other;

in a case that a model update module updates the target functional model, providing, through a database module, the model update module with a target model data set used for update;

in a case that a regression test instruction is received through a regression test module, obtaining, through the regression test module, a target test case set from the database module according to the regression test instruction, and testing the set function of the model application apparatus based on the target test case set to test compatibility between the updated target functional model and an associated functional model thereof;

where the set function of the model application apparatus is implemented based on the updated target functional model and at least one associated functional model of the target functional model.

The above description is merely the preferred embodiments of the present disclosure and explanation of the technical principles applied. Those skilled in the art should understand that the disclosure scope involved in the present disclosure is not limited to the technical solutions formed by the specific combination of the above technical features; at the same time, it should also cover, without departing from the above disclosed concept, other technical solutions formed by any combination of the above technical features or their equivalents, for example, the technical solution that is formed by replacing the above features with the technical features that are disclosed in the present disclosure (but not limited to) and have similar functions.

In addition, although operations are illustrated in a particular order, this should not be understood, however, as requiring the operations to be performed in the particular order shown or in a sequential order. Under certain circumstances, multitasking and parallel processing may be beneficial. Likewise, although the above discussion contains several specific implementation details, these should not be construed as limitations on the scope of the present disclosure. Some features described in the context of separate embodiments can also be implemented in combination in a single embodiment. Conversely, the features described in the context of a single embodiment can also be implemented, in multiple embodiments, separately or in any appropriate sub-combination.

Although the subject has been described in language specific to structural features and/or logical actions of method, it should be understood, however, that the subject defined in the appended claims is not necessarily limited to the specific features or actions described above. On the contrary, the specific features and actions described above are merely example forms of implementing the claims.

What is claimed is:

1. A model management apparatus, comprising:

one or more processors; and a storage apparatus, configured to store one or more programs, wherein the one or more programs, when executed by the one or more processors, cause the one or more processors to:

receive, through a model update module, an update instruction of a target functional model;

determine, according to the received update instruction, a target functional model to be updated from at least one functional model stored in a model storage module, and perform functional update on the target functional model to be updated based on a target model data set, wherein the functional update comprises retraining of the target functional model to be updated using the target model data set;

transmit an updated target functional model to the model storage module for storage;

receive, through a model test service module, a first loading task instruction; and load, according to the first loading task instruction, the updated target functional model and an associated functional model of the updated target functional model from the model storage module to the model test service module, so that an offline model application apparatus calls, in a test phase, the updated target functional model and the associated functional model of the updated target functional model from the model test service module to cause the offline model application apparatus to implement a set function, wherein the offline model application apparatus and the model management apparatus are set up independently of each other, and wherein the set function is implemented based on the updated target functional model and the associated functional model of the updated target functional model, and comprises a natural language understanding function;

wherein the target functional model comprises a vertical domain categorization model, and the associated functional model of the updated target functional model comprises at least one of a domain intention categorization model or a slot sequence annotation model, wherein each piece of data in a vertical domain categorization data set of the target model data set comprises input information in human-machine dialogue and a correct vertical domain corresponding to the input information.

2. The apparatus according to claim 1, wherein the one or more processors are further caused to:

receive, through a model production service module, a second loading task instruction; and load, according to the second loading task instruction, the updated target functional model and the associated functional model of the updated target functional model from the model storage module to the model production service module, so that an online model application apparatus calls, in a use phase, the updated target functional model and the associated functional model of the updated target functional model from the model production service module to implement the set function;

wherein the set function is implemented based on the updated target functional model and the associated functional model of the updated target functional model, and wherein the online model application apparatus and the model management apparatus are set up independently of each other.

3. The apparatus according to claim 1, wherein the offline model application apparatus comprises a natural language understanding apparatus; wherein the update instruction is triggered by an operation and maintenance personnel of the model management apparatus, and the update instruction comprises a name or an identifier (ID) of the target functional model to be updated.

4. The apparatus according to claim 1, wherein the target functional model comprises a domain intention categorization model, and the associated functional model of the updated target functional model comprises at least one of a vertical domain categorization model or a slot sequence annotation model, wherein each piece of data in a domain intention categorization data set of the target model data set comprises input information in human-machine dialogue and a correct domain intention corresponding to the input information.

5. The apparatus according to claim 1, wherein the target functional model comprises a slot sequence annotation model, and the associated functional model of the updated target functional model comprises at least one of a vertical domain categorization model or a domain intention categorization model, wherein each piece of data in a slot sequence annotation data set of the target model data set comprises input information in human-machine dialogue and a correct slot sequence annotation corresponding to the input information.

6. A model management method, comprising:

receiving, through a model update module, an update instruction of a target functional model;

determining, according to the update instruction, a target functional model to be updated from at least one functional model stored in a model storage module, and performing functional update on the target functional model to be updated based on a target model data set, wherein the functional update comprises retraining of the target functional model to be updated using the target model data set;

transmitting an updated target functional model to the model storage module for storage;

receiving, through a model test service module, a first loading task instruction; and loading, according to the first loading task instruction, the updated target functional model and an associated functional model of the updated target functional model from the model storage module to the model test service module, so that an offline model application apparatus calls, in a test phase, the updated target functional model and the associated functional model of the updated target functional model from the model test service module to cause the offline model application apparatus to implement a set function;

wherein the offline model application apparatus and a model management apparatus are set up independently of each other, and wherein the set function is implemented based on the updated target functional model and the associated functional model of the updated target functional model, and comprises a natural language understanding function;

wherein the target functional model comprises a vertical domain categorization model, and the associated functional model of the updated target functional model comprises at least one of a domain intention categorization model or a slot sequence annotation model, wherein each piece of data in a vertical domain categorization data set of the target model data set comprises input information in human-machine dialogue and a correct vertical domain corresponding to the input information.

7. The method according to claim 6, further comprising:

receiving, through a model production service module, a second loading task instruction;

loading, according to the second loading task instruction, the updated target functional model and the associated functional model of the updated target functional model from the model storage module to the model production service module, so that an online model application apparatus calls, in a use phase, the updated target functional model and the associated functional model of the updated target functional model from the model production service module to implement the set function;

wherein the setting function is implemented based on the updated target functional model and the associated functional model of the updated target functional model, and wherein the online model application apparatus and the model management apparatus are set up independently of each other.

8. A non-transitory storage medium, containing computer-executable instructions, wherein the computer-executable instructions, when executed by a computer processor, are used to execute the model management method according to claim 6.

9. A data management method, comprising:

in response to determining that a model update module of a model management apparatus is to update a target functional model, providing, through a database module, the model update module with a target model data set used for update;

in response to determining that a regression test instruction is received through a regression test module, obtaining, through the regression test module, a target test case set from the database module according to the regression test instruction, and testing a set function of a model application apparatus based on the target test case set to test compatibility between an updated target functional model and an associated functional model thereof;

in response to determining that a model update instruction is received through a task scheduling module, transmitting an update instruction to the model update module; and in response to detecting through the task scheduling module that update of the target functional model is completed, transmitting a first loading task instruction to a model test service module to cause the model test service module to load, from a model storage module storing at least one functional model, the updated target functional model and the associated functional model of the updated target functional model, so that an offline model application apparatus calls, in a test phase, the updated target functional model and the associated functional model of the updated target functional model from the model test service module to cause the model application apparatus to implement the set function, wherein the update of the target functional model comprises retraining of the target functional model to be updated using the target model data set, wherein the offline model application apparatus and the model management apparatus are set up independently of each other, and wherein the set function is implemented based on the updated target functional model and the associated functional model of the updated target functional model, and comprises a natural language understanding function;

wherein the target functional model comprises a vertical domain categorization model, and the associated functional model of the updated target functional model comprises at least one of a domain intention categorization model or a slot sequence annotation model, wherein each piece of data in a vertical domain categorization data set of the target model data set comprises input information in human-machine dialogue and a correct vertical domain corresponding to the input information.

10. The method according to claim 9, wherein the testing the set function of the model application apparatus based on the target test case set to test compatibility between the updated target functional model and the associated functional model thereof comprises:

for each test case in the target test case set, transmitting input information of a current test case to the offline model application apparatus, to cause the offline model application apparatus to call, based on the input information, the updated target functional model and the associated functional model of the updated target functional model from the model test service module to obtain an output result; wherein the updated target functional model and the associated functional model of the model test service module are loaded from the model storage module after update of the target functional model is completed;

comparing the output result with output information of the current test case; and determining a test result according to a comparison result.

11. The method according to claim 9, further comprising at least one of the following:

in response to determining that a test instruction is received through the task scheduling module, transmitting the regression test instruction to the regression test module; and in response to detecting through the task scheduling module that the test is passed, transmitting a second loading task instruction to a model production service module to cause the model production service module to load, from the model storage module, the updated target functional model and the associated functional model of the updated target functional model, so that an online model application apparatus calls, in a use phase, the updated target functional model and the associated functional model of the updated target functional model from the model production service module to implement the set function, wherein the online model application apparatus and the model management apparatus are set up independently of each other.

12. The method according to claim 9, further comprising: receiving, through a user interface module, a user instruction, and managing, according to the user instruction, data stored in the database module, and/or transmitting the user instruction to the task scheduling module to trigger the task scheduling module to schedule tasks executed by the regression test module and modules in the model management apparatus.

13. A non-transitory storage medium, containing computer-executable instructions, wherein the computer-executable instructions, when executed by a computer processor, are used to execute the data management method according to claim 9.

14. The method according to claim 9, wherein the target functional model comprises a domain intention categorization model, and the associated functional model of the updated target functional model comprises at least one of a vertical domain categorization model or a slot sequence annotation model, wherein each piece of data in a domain intention categorization data set of the target model data set comprises input information in human-machine dialogue and a correct domain intention corresponding to the input information.

15. The method according to claim 9, wherein the target functional model comprises a slot sequence annotation model, and the associated functional model of the updated target functional model comprises at least one of a vertical domain categorization model or a domain intention categorization model, wherein each piece of data in a slot sequence annotation data set of the target model data set comprises input information in human-machine dialogue and a correct slot sequence annotation corresponding to the input information.

16. A data management apparatus, comprising:

one or more processors; and a storage apparatus, configured to store one or more programs, wherein the one or more programs, when executed by the one or more processors, cause the one or more processors to implement the data management method according to claim 9.

17. An intelligent dialogue system, comprising the model management apparatus, the data management apparatus according to claim 16, the offline model application apparatus, and an online model application apparatus, wherein the model management apparatus comprises: one or more processors, and a storage apparatus configured to store one or more programs, wherein the one or more programs, when executed by the one or more processors, cause the one or more processors to:

receive, through the model update module, the update instruction of the target functional model;

determine, according to the received update instruction, the target functional model to be updated from the at least one functional model stored in the model storage module, and perform functional update on the target functional model to be updated based on a target model data set, and transmit the updated target functional model to the model storage module for storage;

receive, through the model test service module, the first loading task instruction; and load, according to the first loading task instruction, the updated target functional model and the associated functional model of the updated target functional model from the model storage module to the model test service module, so that the offline model application apparatus calls, in the test phase, the updated target functional model and the associated functional model of the updated target functional model from the model test service module to cause the offline model application apparatus to implement the set function.

18. The system according to claim 17, wherein the target functional model further comprises at least one of domain intention categorization model or a slot sequence annotation model, wherein when the target functional model comprises the domain intention categorization model, the associated functional model of the updated target functional model comprises at least one of the vertical domain categorization model or the slot sequence annotation model, wherein each piece of data in a domain intention categorization data set of the target model data set comprises the input information in human-machine dialogue and a correct domain intention corresponding to the input information, and wherein when the target functional model comprises the slot sequence annotation model, the associated functional model of the updated target functional model comprises at least one of the vertical domain categorization model or the domain intention categorization model, wherein each piece of data in a slot sequence annotation data set of the target model data set comprises the input information in human-machine dialogue and a correct slot sequence annotation corresponding to the input information.

* * * * *